Dec. 29, 1959   W. GLASER   2,919,381
ELECTRON LENS
Filed July 25, 1956   6 Sheets-Sheet 1

INVENTOR
Walter Glaser
BY
ATTORNEYS

Dec. 29, 1959 W. GLASER 2,919,381
ELECTRON LENS
Filed July 25, 1956 6 Sheets-Sheet 2

INVENTOR
Walter Glaser
BY
ATTORNEYS

Dec. 29, 1959     W. GLASER     2,919,381
ELECTRON LENS
Filed July 25, 1956     6 Sheets-Sheet 3

INVENTOR
Walter Glaser
BY
ATTORNEYS

Dec. 29, 1959 W. GLASER 2,919,381
ELECTRON LENS
Filed July 25, 1956 6 Sheets-Sheet 4

INVENTOR
Walter Glaser
BY
Pennie Edmonds Morton Barrows Taylor
ATTORNEYS

Dec. 29, 1959    W. GLASER    2,919,381
ELECTRON LENS
Filed July 25, 1956    6 Sheets-Sheet 5

INVENTOR
Walter Glaser
BY
ATTORNEYS

Dec. 29, 1959    W. GLASER    2,919,381
ELECTRON LENS

Filed July 25, 1956    6 Sheets-Sheet 6

INVENTOR
Walter Glaser
BY
ATTORNEYS

United States Patent Office

2,919,381
Patented Dec. 29, 1959

2,919,381

ELECTRON LENS

Walter Glaser, Mount Vernon, N.Y., assignor to Farrand Optical Co., Inc., New York, N.Y., a corporation of New York Application July 25, 1956, Serial No. 600,135

18 Claims. (Cl. 315—31)

This invention relates to electron lenses and particularly to electron lenses and combinations thereof which can be corrected for spherical aberration.

The invention provides electron lenses having about their axes two-fold rather than complete rotational symmetry and which operate stigmatically in the range of Gaussian dioptrics. These lenses of the invention comprise two four-pole elements, either electrostatic or electromagnetic, suitably spaced in accordance with the principles of the invention and rotated with respect to each other through 90° about their common axis. The invention further provides electron lenses of four-fold symmetry which possess negative spherical aberration of the third order. These lenses are employed according to the invention as projection lenses in combination with a preceding rotationally symmetric objective lens to provide a compound microscope corrected with respect to spherical aberration of the third order.

The invention will now be described in detail in terms of a number of exemplary embodiments by reference to the accompanying drawings in which.

Figure 4:
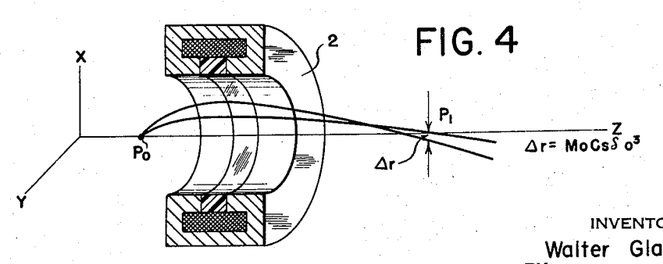
Figure 5:
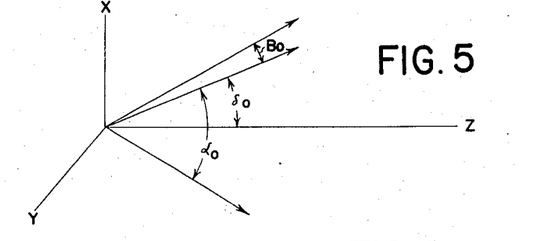

Rotationally symmetric electron lenses whether of the electrostatic or magnetic type are afflicted with spherical aberration of the so-called under-corrected type in which the rays departing for example from an axial object point at higher aperture angles intersect the axis after passing through the lens at positions nearer the lens than do rays departing at lower aperture angles. This state of affairs is illustrated in Fig. 4, where there is shown a fragment of a magnetic electron lens 2 operating to produce an image of an axial object point $P_0$. For paraxial rays, i.e. rays the aperture angle of which is small enough so that, for the degree of resolution desired in the image, only first-order terms need be considered, the image point lies on the lens axis at $P_1$. Rays of larger aperture angle, for which the third-order terms must be considered, intersect the axis short of $P_1$. In the Gaussian image plane transverse to the axis at $P_1$, the rays passed by the lens produce a circle whose radius $\Delta r$ is given by $$\Delta r = M_o C_s \delta_0^3 \tag{1}$$

in which $M_o$ is the angular magnification at which the lens is operating with respect to the points $P_0$ and $P_1$, $C_s$ is the spherical aberration constant of the lens, and $\delta_0$ is the aperture angle for the ray in question, e.g. the ray of highest aperture angle passed by the lens. If for a particular ray of aperture angle $\delta_0$ the components of the aperture angle on two orthogonal $x$—$z$ and $y$—$z$ meridian planes are identified as $\alpha_0$ and $\beta_0$ (cf. Fig. 5), the $x$- and $y$-departures in the Gaussian image plane at $P_1$ in Fig. 4 of the intersection of that ray with that plane will be given by $$\Delta x_1 = M_o C_s (\alpha_0^2 + \beta_0^2) \alpha_0 \tag{2}$$

$$\Delta y_1 = M_o C_s (\alpha_0^2 + \beta_0^2) \beta_0 \tag{3}$$

The fact that the lens is undercorrected is expressed by the fact that $$C_s > 0$$

$C_s$ is positive for all rotationally symmetric electron lenses, electrostatic as well as magnetic. Consequently it is not possible to correct the spherical aberration of one such lens by combining it with an overcorrected rotationally symmetric lens, as is common in light optics.

Figure 6:
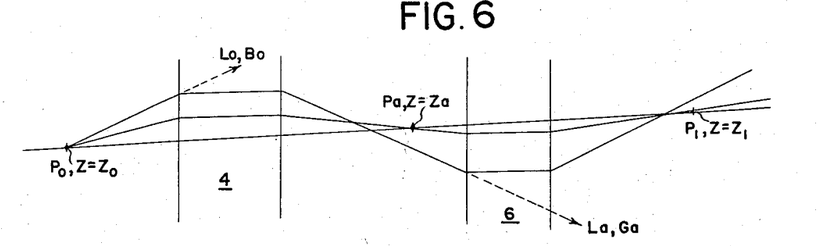

Fig. 6 illustrates the effect of compounding two rotationally symmetric electron lenses 4 and 6, diagrammatically illustrated by means of their principal planes. The lens 4 produces from an object point $P_0$ an intermediate image whose Gaussian image plane intersects the system axis at $P_a$. This intermediate image is transferred by the lens 6 to a final image for which the Gaussian plane intersects the system axis at $P_1$. A ray from $P_0$ of aperture angle $\delta_0$ larger than paraxial and having components $\alpha_0$ and $\beta_0$ intersects the Gaussian plane at $P_a$ in a point having coordinates $$x_a = M_o C_{so} (\alpha_0^2 + \beta_0^2) \alpha_0 \tag{4}$$

$$y_a = M_o C_{so} (\alpha_0^2 + \beta_0^2) \beta_0 \tag{5}$$

in which $M_o$ is the magnification at which the lens 4 operates with respect to the point $P_0$ and $C_{so}$ is the spherical aberration constant thereof. The same ray on passing through the lens 6 intersects the Gaussian image plane at $P_1$ in a point whose $x$- and $y$-coordinates $x_1$ and $y_1$ are $$x_1 = M_p x_a + M_p C_{sp} (\alpha_a^2 + \beta_a^2) \alpha_a \quad (6)$$

$$y_1 = M_p y_a + M_p C_{sp} (\alpha_a^2 + \beta_a^2) \beta_a \quad (7)$$

in which $M_p$ is the magnification of the lens 6 with respect to the point $P_a$, $C_{sp}$ is the spherical aberration coefficient of the lens 6, and $\alpha_a$, $\beta_a$ are the components of the aperture angle of the ray at the $P_a$ position. $\alpha_a$, $\alpha_0$, $\beta_a$, $\beta_0$ are related according to the Helmholtz-Lagrange theorem $$\alpha_a = \alpha_0 / M_o, \quad \beta_a = \beta_0 / M_o$$

Hence (6) and (7) can be written thus:

$$x_1 = M_o M_p (C_{so} + M_o^{-4} C_{sp})(\alpha_0^2 + \beta_0^2) \alpha_0 \quad (8)$$

$$y_1 = M_o M_p (C_{so} + M_o^{-4} C_{sp})(\alpha_0^2 + \beta_0^2) \beta_0 \quad (9)$$

Consequently an image corrected for spherical aberration of the third order will appear in the final image plane at $P_1$ if $$C_{sp} = -M_o^{-4} C_{so} \quad (10)$$

Condition (10) cannot be satisfied with rotationally symmetric electron lenses. The invention provides however electron lenses which are not rotationally symmetric. In accordance with the invention there are provided non-rotationally symmetric lenses of two-fold symmetry, comprising two four-pole elements, which produce stigmatic undistorted images in the first order region. Further in accordance with the invention there are provided lenses of four-fold symmetry, comprising two four-pole elements and two or more eight-pole elements, which possess effectively a negative constant of spherical aberration in the third order region. Further in accordance with the invention there are provided compound lenses comprising a rotationally symmetric electron lens and a non-rotationally symmetrical lens, the compound lens being corrected for spherical aberration of the third order.

Figure 1:
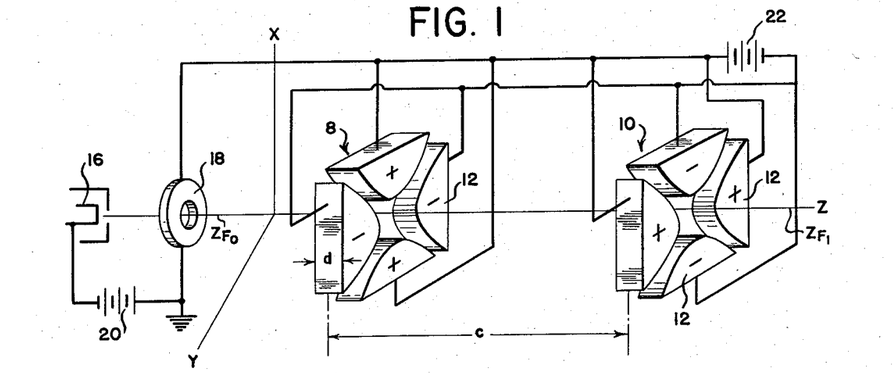
Fig. 1 is a diagrammatic perspective view of an electrostatic four-pole lens according to the invention.
Figures 2, 3:
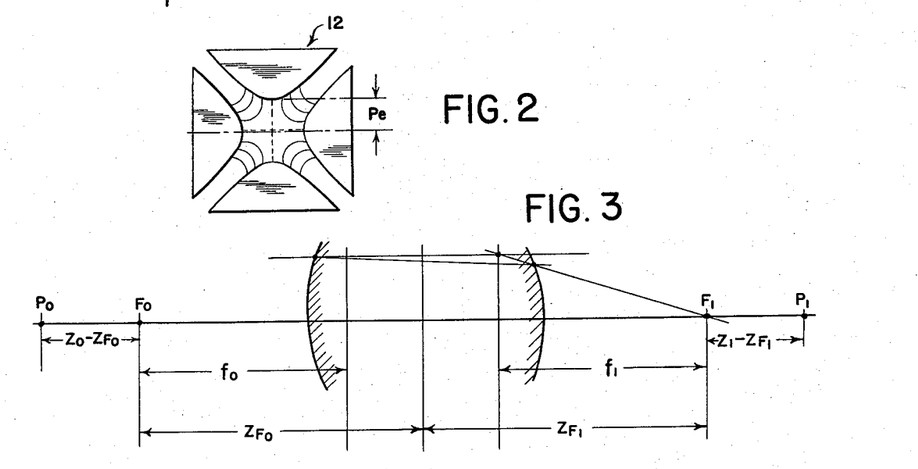
Fig. 2 is an elevational view of one of the four-pole elements of the lens of Fig. 1.
Figs. 3 to 6 are diagrams useful in explaining the invention.

Fig. 1 is a diagrammatic perspective view of an electrostatic four-pole lens according to the invention. This lens possesses two orthogonal planes of symmetry. In the figure these are the $x$—$z$ and $y$—$z$ planes identified by the system of coordinates shown. The lens of Fig. 1 comprises two four-pole elements generally indicated at 8 and 10, suitably supported in coaxial relation by means not shown. The electron optical axis is identified as the $z$-axis of a system of $x$—$y$—$z$ rectangular coordinates. The two four-pole elements are identical. Each comprises four electrostatic poles 12 equiangularly spaced about the lens axis. These are suitably supported by insulating means not shown so that an electrostatic potential difference can be maintained in successively opposite polarity between circumferentially adjacent poles in each four-pole element. Moreover the two four-pole elements are displaced 90° with respect to each other about the system axis so that in Fig. 1 in the element 8 the poles centered on the $x$—$z$ plane are positive while in the element 10 the elements centered on the $x$—$z$ plane are negative. The lens is shown in association with an electron source including a cathode 16 and accelerating electrode 18, a source of accelerating voltage 20 and a source of lens voltage 22. Fig. 2 shows the appearance of the elements 8 and 10 in elevation, together with the shape of the field between the poles thereof.

In the $x$—$z$ plane the element 8 is evidently divergent on a beam of electrons passing down the system axis whereas it is convergent in the $y$—$z$ plane, and vice versa in the case of the element 10. Together the two four-pole elements of the lens of Fig. 1 have a net convergent effect in each of the orthogonal planes of symmetry of the lens. In terms of the axial thickness $d$ of each of the four-pole elements, the radius $\rho_e$ of the opening on the axis of each element (Fig. 2), the potential difference $u$ between the oppositely charged poles thereof and the incident energy $U$ of the electrons upon entering the lens, it is possible to define for the four-pole lens comprising the two four-pole elements 8 and 10 a dimensionless parameter $$k^2 = d^2 \left[ \frac{1}{\rho_e^2} \frac{u}{2U} \frac{1+2\epsilon U}{1+\epsilon U} \right] \quad (11)$$

in Equation 11 $\epsilon$ is a relativistic correction factor given by $$\epsilon = \frac{e}{2m_o c^2}$$

in which $$\frac{e}{m_o}$$

is the specific charge of the electron and $c$ is the velocity of light.

Figure 7:
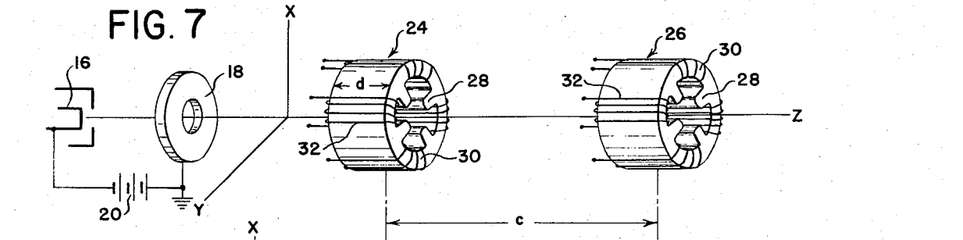
Fig. 7 is a diagrammatic perspective view of a magnetic four-pole lens according to the invention.

While a lens consisting of two four-pole electrostatic elements such as 8 and 10 in Fig. 1, or two four-pole magnetic elements such as 24 and 26 in Fig. 7 is convergent in both of its meridian planes of symmetry and has the same power in both, the principal planes with respect to the two symmetry planes are in general at different axial locations so that the focal points will not coincide and the system will be astigmatic. In accordance with the invention however stigmatic images are produced by a proper spacing of the two elements.

The lens of Fig. 1 will produce stigmatic undistorted images of the first order when the two four-pole elements are separated by a spacing $c$ between the axial mid planes of the four-pole elements which is related to the element thickness $d$ and the lens parameter $k^2$ by the relation:

$$\frac{2d}{c} = \frac{\sqrt{k^2-1}}{k^2} \coth \pi\sqrt{k^2-1} - \frac{\sqrt{k^2+1}}{k^2} \cot \pi\frac{\sqrt{k^2+1}}{k^2} \quad (12)$$

With this separation condition satisfied, the principal focal points $f_0$ and $f_1$ of the lens comprising elements 8 and 10 are distant from the lens center plane, i.e. the plane perpendicular to the lens axis and half way between elements 8 and 10, by distances $Z_{F_0}$ and $Z_{F_1}$ given by:

$$Z_{F_1} = \frac{c}{1} + \frac{d}{2}.$$

$$\sqrt{k^4-1} \frac{\sqrt{k^2+1} \sinh 2\pi\sqrt{k^2-1} - \sqrt{k^2-1} \sin 2\pi\sqrt{k^2+1}}{(k^2+1) \sinh^2 \pi\sqrt{k^2-1} - (k^2-1) \sin^2 \pi\sqrt{k^2+1}}$$

$$= -Z_{F_0} \quad (13)$$

the focal lengths, measured from the principal planes are given by:

$$f_0 = d \cdot \sqrt{k^4-1} \frac{\sqrt{k^2+1} \cos \pi\sqrt{k^2+1} \sinh \pi\sqrt{k^2-1} - \sqrt{k^2-1} \cosh \pi\sqrt{k^2-1} \sin \pi\sqrt{k^2+1}}{(k^2+1) \sinh^2 \pi\sqrt{k^2-1} - (k^2-1) \sin^2 \pi\sqrt{k^2+1}} = -f_1 \quad (14)$$

The dimensions and distances $f_0$, $f_1$, $Z_{F_0}$ and $Z_{F_1}$ are shown for the light optical analog of the lens of Fig. 1 in Fig. 3 where are also shown axial object and image points $P_0$ and $P_1$. Denoting the distance of the object point from the first principal focus as $z_0 - Z_{F_0}$ and the distance of the image point from the second principal focus as $z_1 - Z_{F_1}$, the magnification of the lens for points $P_1$ and $P_2$ is given by $$M = \frac{z_1 - Z_{F_1}}{f_1} = \frac{f_0}{z_0 - Z_{F_0}} \quad (15)$$

The focal lengths of the lens of Fig. 1, not shown to scale in Fig. 3, are such that object locations which will result in the formation of an enlarged image lie within the field produced by the first four-pole element. For this reason the lens is used as a projector, and provides image formation by operation on the asymptotes of the rays from a preceding objective lens from which it is so spaced that, assuming the lens of Fig. 1 for the moment de-energized, the intermediate image produced by the objective will lie outside the first principal focus $Z_{F_0}$ of the lens of Fig. 1. When the lens of Fig. 1 is thus energized, it will produce a final image which is stigmatic and undistorted to the first order, if the virtual object employed therewith is similarly stigmatic and undistorted.

Figure 8:
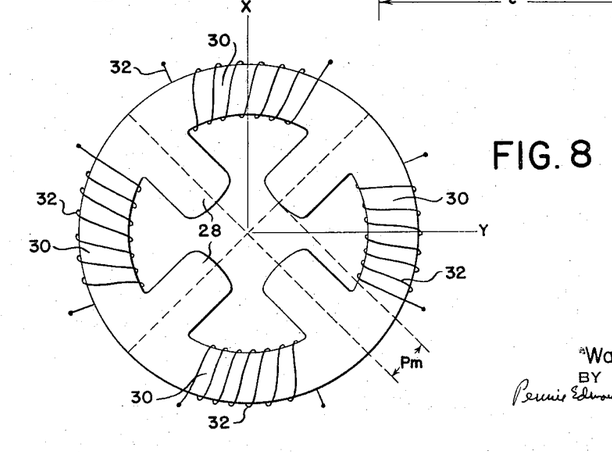
Fig. 8 is an elevational view of one of the four-pole elements of Fig. 7.

Fig. 7 is a diagram similar to that of Fig. 1 but illustrating a magnetic four-pole lens according to the invention. The lens comprises two identical magnetic four-pole elements 24 and 26 which are, as in the case of Fig. 1, 90° displaced with each other rotationally about the system axis, so that the north poles of the element 24 are aligned with the south poles of the element 26. Each of the four-pole elements includes four magnetic poles 28 equiangularly displaced about the system axis as indicated in Fig. 8. Conveniently all four poles are formed on a common yoke structure 30. The poles are energized to successively opposite magnetic potentials by four windings 32 each generating a flux NI. The axial length of the four-pole elements is again denoted $d$, and the separation of the center planes of the elements is $c$. As indicated in Fig. 8 the radius of the opening between their poles is $\rho_m$. It will be observed that the $x$—$z$ and $y$—$z$ symmetry planes of maximum action on electrons bisect the angular spacings between the magnetic poles whereas in the embodiment of Fig. 1 they bisect the electrostatic poles themselves.

For the lens of Fig. 7 the lens parameter $k^2$ takes the form $$k^2 = d^2 \mu_0 \sqrt{\frac{e}{2m_0}} \frac{1}{\rho_m^2} \frac{NI}{\sqrt{U(1+\epsilon U)}} \qquad (16)$$

Here $\mu_0$ is the inductivity of the vacuum while $$\frac{e}{m_0}$$

U and $\epsilon$ have the same significance as in Equation 11. The spacing condition of the two four-pole elements for stigmatic and undistorted Gaussian image formation is again equation 12. For the lens of Fig. 7 the distances $Z_{F_0}$ and $Z_{F_1}$ of the focal points from the center plane of the lens and the focal lengths from the principal planes are given by the same relations (13) and (14) as in the case of the lens of Fig. 1, the lens parameter $k^2$ having however for the lens of Fig. 7 the value given by Equation 16 rather than that of Equation 11.

While the lenses of Figs. 1 and 7 have utility in forming stigmatic distortionless first-order images, the invention further provides rotationally non-symmetric lenses which permit correction of third-order spherical aberration when used with a rotationally symmetric lens as objective. Moreover with such combinations useful magnifications may be achieved.

Figures 10, 11, 13:
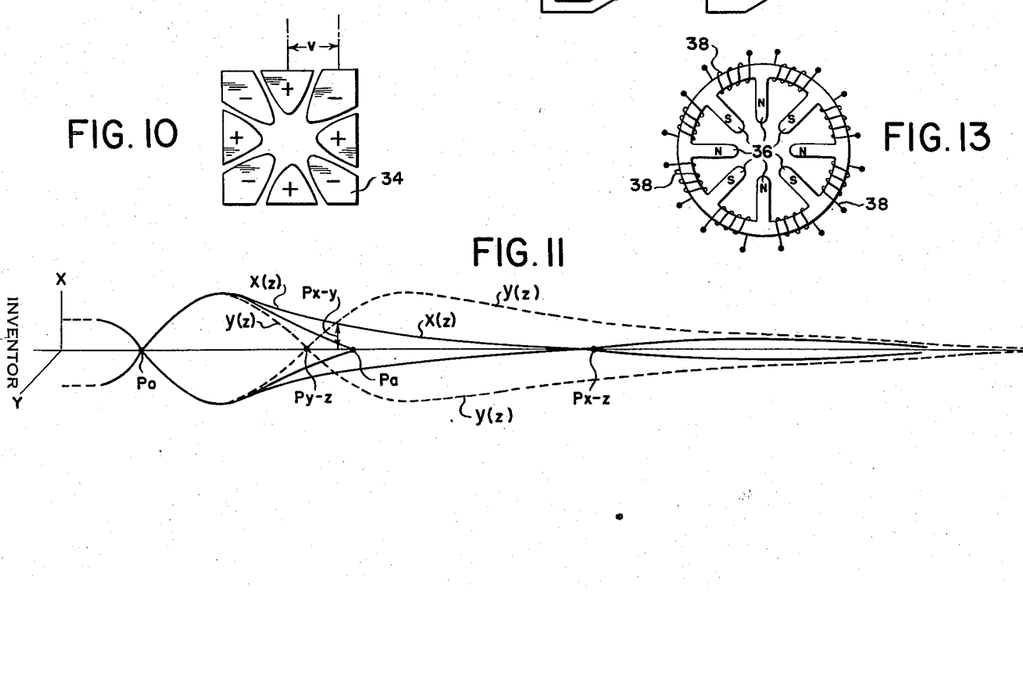
Fig. 10 is an elevational view of one of the eight-pole elements of the lens of Fig. 9.
Fig. 11 is an electron ray diagram useful in explaining the operation of the apparatus of Fig. 9.
Fig. 13 is an elevational view of one of the eight-pole elements of the lens of Fig. 12.

In order to achieve image formation stigmatic and corrected to the third order it is necessary to supplement the field of two-fold symmetry produced by lenses of the type illustrated in Figs. 1 and 7 with a field of four-fold symmetry. Figs. 10 and 13 are elevational views respectively of eelctrostatic and magnetic eight-pole elements which may be employed as correctors with lenses of the form of Figs. 1 and 7 in order to permit third order correction. The correcting element of Fig. 10 comprises eight electrostatic poles 34 equiangularly disposed about an axis and charged to successively opposite electrostatic potentials by any suitable means. Fig. 13 shows that the magnetic analog comprises eight magnetic poles 36 equiangularly disposed about an axis and charged to successively opposite magnetic potentials. For this purpose there are desirably provided eight windings which may either embrace the salient poles themselves or the portions of the external yoke between adjacent poles. In the latter case the flux of each coil is effective across the gap between the adjacent poles. When the windings are provided on the salient poles themselves (as may also be done with the magnetic four-pole elements) the flux of each winding is shared between two pairs of poles having a common pole but the resultant flux is the same in the central opening of the element.

Figure 9:
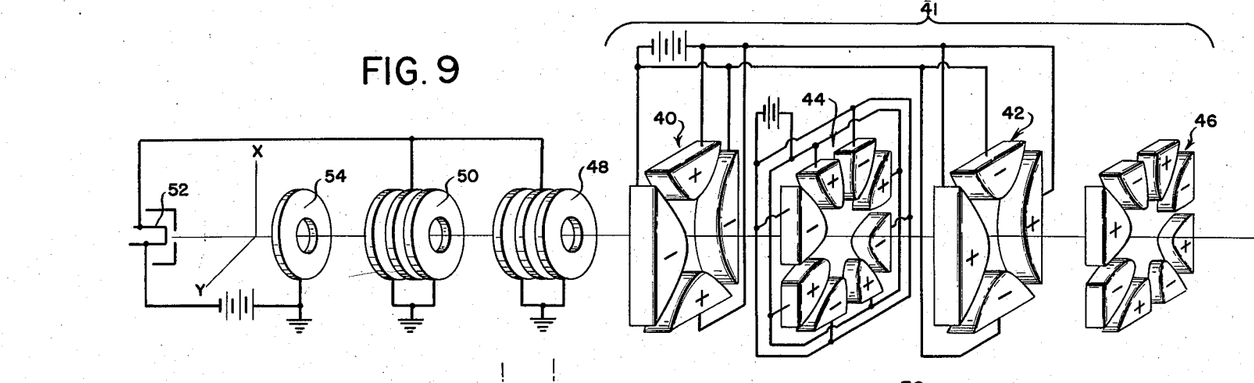
Fig. 9 is a diagrammatic perspective view of a four-pole electrostatic electron lens according to the invention including two eight-pole elements, shown in association with a rotationally symmetric objective electron lens preceding it.

Fig. 9 is a diagrammatic perspective view of an electrostatic electron lens according to the invention comprising two four-pole elements 40 and 42 and two eight-pole elements 44 and 46. Elements 40 and 42 are of the type described in connection with Fig. 1 and are 90° displaced with respect to each other about the lens axis $z$. The spacing of the elements 40 and 42 satisfy Equation 12. In association with this lens there is shown a rotationally symmetric objective lens 48 and also a condenser lens 50 and an electron gun including a cathode 52 and an anode 54.

Figures 12, 14, 15, 16, 17:
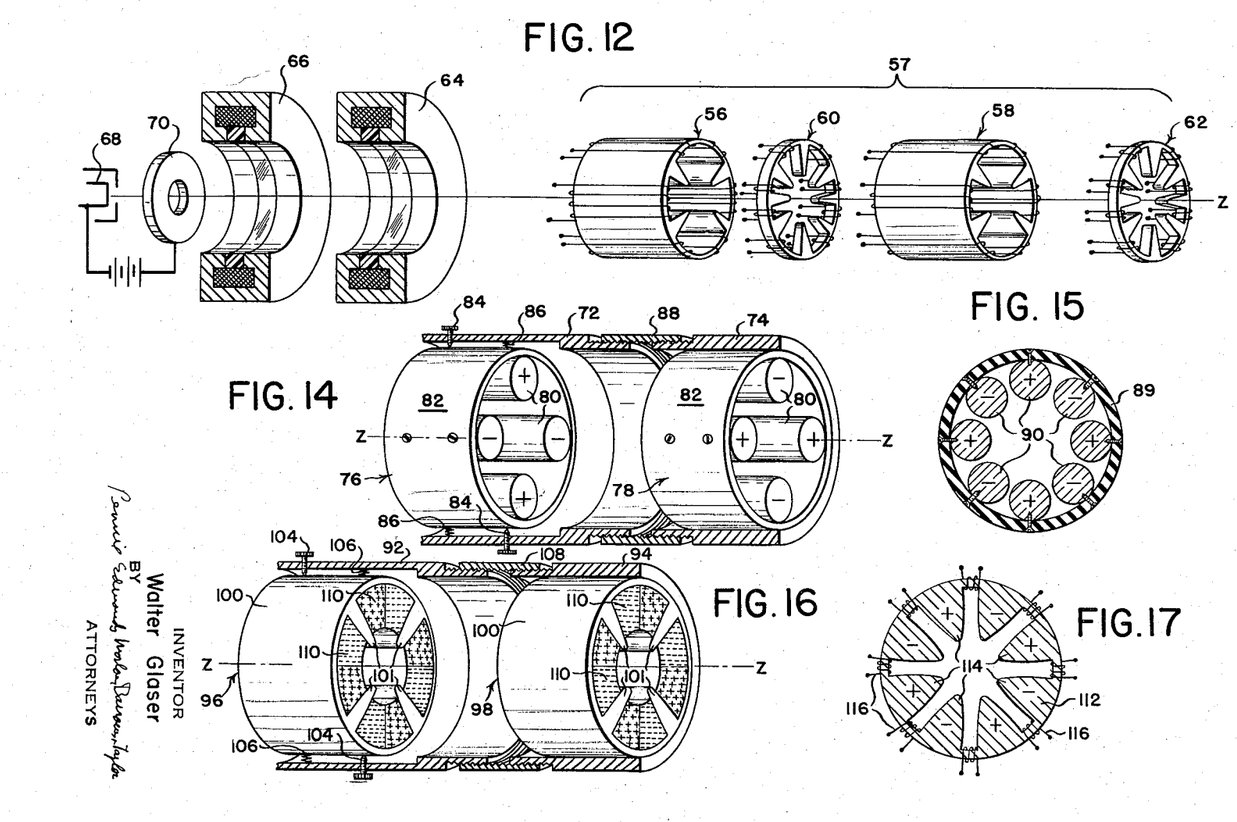
Fig. 12 is a diagrammatic perspective view of a four-pole magnetic electron lens according to the invention including two eight-pole elements, shown in association with a rotationally symmetric objective electron lens preceding it.
Fig. 14 is a perspective view of one form of four-pole electrostatic electron lens according to the invention.
Fig. 15 is a view in elevation of an eight-pole element for use with the lens of Fig. 14.
Fig. 16 is a perspective diagrammatic view of one form of magnetic four-pole electron lens according to the invention.
Fig. 17 is a view in elevation of one form of an eight-pole magnetic element suitable for use with the lens of Fig. 16.

The operation of the lens of Fig. 9 can be understood qualitatively by reference to Fig. 11 which is an electron ray diagram illustrating alternatively the operation of the apparatus of Fig. 9 or of Fig. 12. In Fig. 11 an axial object point $P_0$ is considered to be illuminated from a suitable electron source, which may or may not include a condenser lens such as the lens 50 of Fig. 9. Electrons diverging from the object point $P_0$ are imaged by the objective 48. In the absence of the corrected four-pole lens comprising elements 40, 42, 44 and 46 these electrons would be brought to focus, with spherical aberration of the third order, at an intermediate image location for which the Gaussian image plane is indicated at $P_a$. This image formation is rotationally symmetric. If now the non-rotational lens comprising elements 40, 42, 44 and 46 is suitably energized, the operation of element 40 in the $x$—$z$ plane will be divergent as indicated by the sample pair of full line electron trajectories identified as $x(z)$. These may be considered either as electron trajectories in the $x$—$z$ plane, or as the projection onto that plane of trajectories outside it. By virtue of this divergent action the trajectories $x(z)$ come to an intermediate focus at point $P_{x-z}$, beyond $P_a$. Diverging from $P_{x-z}$, the trajectories $x(z)$ are then subjected to the action of element 42, which is convergent in the $x$—$z$ plane, and are hence caused to converge again at $P_1$.

Conversely in the $y$—$z$ plane the element 40 will operate convergently, producing a pair of sample dashed-line electron trajectories $y(z)$ which are brought to a focus at $P_{y-z}$ in advance of the rotationally symmetric intermediate image position $P_a$. Diverging from $P_{y-z}$, trajectories $y(z)$ are still under the influence of element 40 and are hence made once more convergent. As they pass into the field of influence of element 42 however they suffer a divergent effect, so that they do not again come to a focus until they reach the axial position of $P_1$. The axial position $P_{x,y}$ identifies the position of the circle of least confusion between the astigmatic image locations $P_{y-z}$ and $P_{x-z}$ which would be produced by element 40 alone.

The eight-pole elements 44 and 46, which are effective in the extra-axial region, modify the spherical aberration properties of the lens comprising elements 40 and 42 alone in such fashion that the third order spherical aberration of the rotationally symmetric objective and of the orthogonally symmetric lens comprising elements 40, 42, 44 and 46 is zero, without disturbing the Gaussian image formation. Otherwise stated, the image formation by means of the objective 48 and the four-pole elements 40 and 42 is subject to a third order spherical aberration component which cannot in general be made equal to zero because the third order spherical aberration contribution of the four-pole lens comprising elements 40 and 42 alone cannot in general be made equal and opposite to the contribution of the objective 48. According to the invention however two or more eight-pole correcting elements such as the elements 44 and 46 are provided which are effective to modify the extra-axial field. With the help of these eight-pole correcting elements the third order spherical aberration of the complete combination of rotationally symmetric objective and orthogonally symmetrical projection lenses is made to vanish, without disturbing the Gaussian image formation.

Advantageously the axial position of the first eight-pole corrector 44 is that of the circle of least confusion identified in Fig. 11 at $P_{x-y}$. With this choice of location for the corrector 44 a single additional eight-pole element 46 can suffice to provide the desired total correction for the objective and projection lenses, and this element may be located beyond the second four-pole element 42.

Fig. 12 illustrates a magnetic lens according to the invention analogous to the electrostatic lens of Fig. 9. The lens of Fig. 12 includes two identical four-pole magnetic elements 56 and 58 of the type described in connection with Fig. 7, displaced with respect to each other by 90° about a common axis, and two eight-pole elements 60 and 62. These four elements are shown in conjunction with an objective lens 64 of rotationally symmetric type and with a condenser lens 66, cathode 68 and anode 70.

The operation of the lens of Fig. 12 is qualitatively explainable with reference to Fig. 11 in the same fashion as that used above with respect to the electrostatic lens of Fig. 9. In the case of Fig. 12 also the eight-pole corrector element 60 is located at or near the axial position of the circle of least confusion in the astigmatic bundle produced by element 56, and element 62 is located on the side of element 58 opposite the objective lens.

In Fig. 9 the projection lens comprising elements 40, 42, 44 and 46 is identified at a bracket by the character 41, and in Fig. 12 the projection lens comprising elements 56, 58, 60 and 62 is similarly identified at a bracket by the reference character 57. These projection lenses of the invention, and the operation therein of the eight-pole elements 44, 46 and 60, 62 will now be considered in somewhat greater detail in terms of an analysis of the behavior of such a four-element lens in combination with a rotationally symmetric objective lens, as illustrated in Figs. 9 and 12. These lenses will be considered in this operation in imaging an axial object point $P_0$ to the left of the objective into an axial image point $P_1$ to the right of the projector, the nomenclature of image points, electron trajectories and spherical aberration contributions used being that illustrated in Fig. 6.

For either of the projection lenses 41 and 57 the third order spherical aberration is determined by three coefficients $a$, $b$, $c$ which appear in the contributions $\Delta x_1$ and $\Delta y_1$ of that lens to the total spherical aberration in the final image plane of the combination of that lens with an objective. These contributions have the following form:

$$\Delta x_1 = -M_p(a\alpha_a^3 + c\alpha_a\beta_a^2) \quad (17)$$
$$\Delta y_1 = -M_p(b\beta_a^3 + c\beta_a\alpha_a^2)$$

where again $\alpha_a$ and $\beta_a$ are the components of the electron trajectory considered at the intermediate image plane $P_a$ (Fig. 6) and $M_p$ is the magnification of the projection lens with respect to a virtual object at $P_a$. The total spherical aberration produced in the final image plane at $P_1$ by the rotationally symmetric objective and four-fold symmetric projection lenses may then with the help of the Helmholtz-Lagrange relation (7') be written as made up of $x_1$ and $y_1$ components as follows:

$$x_1 = M_p x_a + \Delta x_1 = M_0 M_p [(C_{so} - M_o^{-4}a)\alpha_0^3 + (C_{so} - M_o^{-4}c)\alpha_0\beta_0^2]$$
$$y_1 = M_p y_a + \Delta y_1 = M_0 M_p [(C_{so} - M_o^{-4}b)\alpha_0^3 = (C_{so} - M_o^{-4}c)\beta_0\alpha_0^2]$$
$$(18)$$

In Equation 18 $M_0$ and $C_{so}$ are again the magnification and spherical aberration coefficient of the objective, while $M_p$ is the magnification of the projector. $x_a$ and $y_a$, given by Equations 4 and 3, are the components of spherical aberration produced by the objective.

The axial object point $P_0$ is therefore imaged into an axial point $P_1$ to the third order if $$M_o^4 C_{so} = a, M_o^4 C_{so} = b, M_o^4 C_{so} = c \quad (19)$$

The coefficients $a$, $b$ and $c$ are determined in part by the image-forming field of two-fold symmetry in the paraxial region contributed by the two four-pole elements and in part by the extra-axial field which is to be shaped according to the invention by suitable use of eight-pole elements to result in satisfaction of the correction condition (19). Let this extra-axial field be determined by an arbitrary function $\psi$.

To achieve satisfaction of the correction conditions (19) one can impose on $\psi$ the conditions:

$$a = \int_{z_0}^{z_1} \psi x(z)^4 dz - a_1, \quad c = -3\int_{z_0}^{z_1} \psi x(z)^2 y(z)^2 dz + 3a_2$$
$$b = \int_{z_0}^{z_1} \psi y(z)^4 dz - a_3$$
$$(20)$$

in which $x(z)$ and $y(z)$ are two electron trajectories satisfying the initial conditions:

$$x(z_0) = y(z_0) = 0, x'(z_0) = y'(z_0) = 1$$

$z_0$ is the z-coordinate of the object point $P_0$ for the objective and $z_1$ is the z-coordinate of the final image point $P_1$. $a_1$, $a_2$, $a_3$ in Equation 20 are the spherical aberration coefficients of the four-pole lens comprising two four-pole elements only, i.e. the elements 40 and 42 in Fig. 9 or 56 and 58 in Fig. 12. These coefficients $a_1$, $a_2$, $a_3$ can be calculated for any four-pole lens according to the invention, for example as illustrated in Figs. 1 and 7, and for the four-pole lenses included in the four-pole eight-pole lenses 41 and 57 of Figs. 9 and 12.

Applying (20) to (19), the correction conditions become $$\int_{z_0}^{z_1} \psi x(z)^4 dz = a_1 + M_o^4 C_{so}, \int_{z_0}^{z_1} \psi x(z)^2 y(z)^2 dz = a_2 - \tfrac{1}{3} M_o^4 C_{so}$$
$$\int_{z_0}^{z_1} \psi y(z)^4 dz = a_3 + M_o^4 C_{so}$$
$$(21)$$

To satisfy (21) it is advantageous to put $\psi$ in the form:

$$\psi = C_1 \chi_1 + C_2 \chi_2 + C_3 \chi_3 \quad (22)$$

dividing $\psi$ into three parts which it is convenient to associate with separate parts of the region along the axis from $z_0$ to $z_1$ in which separate eight-pole elements are active. In (22), $C_1$, $C_2$ and $C_3$ determine the power to be given to each of the eight-pole elements, of which in general case three are required. For an eight-pole element, electrostatic or electromagnetic, the power $C$ is specified in terms of the aperture $\rho$ and by the voltage $v$ or ampere turn $NI$ between adjacent poles by the relation:

$$C_k = \left[\frac{vk}{U}\frac{1+2\epsilon U}{1+\epsilon U} + \mu_0 \sqrt{\frac{2e}{m_0}} \frac{N_k I_k}{\sqrt{U(1+\epsilon U)}}\right] \rho_k^5 \quad (23)$$

In (23) the subscript $k$ indicates that the eight-pole aperture radius $\rho$ and the electrostatic voltage $v$ or magnetic potential $NI$ may vary from eight-pole element to eight-pole element. $\chi_1$, $\chi_2$ and $\chi_3$ are three dimensionless functions of $z$ determining the variation with $z$ of the four-fold symmetry correcting fields to be provided. For the eight-pole structures of the invention the functions $\chi$ possess the type $$\chi_k = \frac{1}{[\rho_k^2 + (z-\zeta_k)^2]^{5/2}} \quad (24)$$

in which $\zeta_k$ is the z-coordinate of the center plane of the eight-pole element in question.

Splitting up the integrals of (20) according to (22), one may for brevity write:

$$a_{11}=\int_{z_0}^{z_1}\chi_1 x(z)^4 dz,\ a_{12}=\int_{z_0}^{z_1}\chi_2 x(z)^4 dz,\ a_{13}=\int_{z_0}^{z_1}\chi_3 x(z)^4 dz$$

$$a_{21}=\int_{z_0}^{z_1}\chi_1 x(z)^2 y(z)^2 dz,\ a_{22}\int_{0z}^{z_1} a_{22}=\int_{z_0}^{z_1}\chi_2 x(z)^2 y(z)^2 dz$$

$$a_{23}=\int_{z_0}^{z_1}\chi_3 x(z)^2 y(z)^2 dz,\ a_{31}=\int_{z_0}^{z_1}\chi_1 y(z)^4 dz$$

$$a_{32}=\int_{z_0}^{z_1}\chi_2 y(z)^4 dz,\ a_{33}=\int_{z_0}^{z_1}\chi_3 y(z)^4 dz \quad (25)$$

Introducing (22) into (21) one then obtains a system of linear equations:

$$C_1 a_{11}+C_2 a_{12}+C_3 a_{13}=a_1+M_o{}^4 C_{so}$$
$$C_1 a_{21}+C_2 a_{22}+C_3 a_{23}=a_2-\tfrac{1}{3}M_o{}^4 C_{so}$$
$$C_1 a_{31}+C_2 a_{32}+C_3 a_{33}=a_3+M_o{}^4 C_{so} \quad (26)$$

From this system of equations generally for any three arbitrary functions $\chi_1$, $\chi_2$ and $\chi_3$ the constants $C_1$, $C_2$ and $C_3$ may be determined. In the cases illustrated in Figs. 9 and 12, $\chi_1$, $\chi_2$ and $\chi_3$ are so chosen that $\chi_1$ differs from zero only in the region in advance of the four-pole lens comprising two four-pole elements while $\chi_2$ differs from zero only inside the four-pole lens and $\chi_3$ differs from zero only after or behind it, i.e. on the side of the four-pole lens remote from the objective. Since at axial positions preceding and succeeding the corrected lenses 41 and 57 the system must be rotationally symmetric if stigmatic images are to be formed, one has with these assumed axial values for $\chi_1$, $\chi_2$ and $\chi_3$ the relations:

$$a_{11}=a_{21}=a_{31}=\int_{z_0}^{z_1}\chi_1 x(z)^4 dz$$

$$a_{13}=a_{23}=a_{33}=\int_{z_0}^{z_1}\chi_3 x(z)^4 dz \quad (27)$$

Equations 26 then assume the form:

$$C_1 a_{11}+C_2 a_{12}+C_3 a_{33}=a_1+M_o{}^4 C_{so}$$
$$C_1 a_{11}+C_2 a_{22}+C_3 a_{33}=a_2-\tfrac{1}{3}M_o{}^4 C_{so}$$
$$C_1 a_{11}+C_2 a_{32}+C_3 a_{33}=a_3+M_o{}^4 C_{so} \quad (28)$$

Eliminating $C_1$ and $C_3$ from the Equations 28 gives:

$$C_2(a_{12}-a_{22})=a_1-a_2+4/3 M_o{}^4 C_{so}$$
$$C_2(a_{32}-a_{22})=a_3-a_2+4/3 M_o{}^4 C_{so} \quad (29)$$

Dividing to eliminate $C_2$ gives:

$$\frac{a_{12}-a_{22}}{a_{32}-a_{22}}=\frac{a_1-a_2+4/3 M_o{}^4 C_{so}}{a_3-a_2+4/3 M_o{}^4 C_{so}} \quad (30)$$

The right-hand member of 29 is a positive number which may be designated $\kappa$:

$$\kappa=\frac{a_1-a_2+4/3 M_o{}^4 C_{so}}{a_3-a_2+4/3 M_o{}^4 C_{so}} \quad (31)$$

Rewriting 30 in terms of the values of 25 gives:

$$\int_{z_0}^{z_1}\chi_2(x(z)^2-y(z)^2)(x(z)^2+\kappa y(z)^2)dz=0 \quad (32)$$

Equation 32 will be satisfied by an appropriate choice of $\chi_2$—namely $$\chi_2=\frac{1}{[\rho_2{}^2+(z-\zeta_2)^2]^{9/2}} \quad (33)$$

Thus, the field function $$\chi=C_1\chi_1+C_2\chi_2+C_3\chi_3$$

can be realized by the use, in the general case, of three-eight pole elements of the types illustrated in Figs. 10 and 13, whose strength C (in terms of interpole voltage or magnetic potential) and position $\chi$ (for which $z=\zeta$) are given by Equations 23 and 24.

For the corrector to lie between the four-pole elements we insert $\chi_2$ from (33) into (32) which gives:

$$\int_{z_0}^{z_1}\frac{(x(z)^2-y(z)^2)(x(z)^2+\kappa y(z)^2)}{[\rho_2{}^2+(z-\zeta_2)^2]^{9/2}}dz=0 \quad (34)$$

Equation 34 is the condition which the position $\zeta_2$ of the eight-pole corrector must satisfy.

As is apparent from inspection of (33), $\chi_2$ is a bell-shaped function with a steep maximum at $z=\zeta_2$. The value of $\zeta_2$ can be obtained by evaluation of (34). Approximately however because of this steep maximum the variable $z$ in the numerator functions can be set equal to $\zeta_2$, and these functions can be taken outside the integral, in view of the negligible contribution of the product of numerator functions with $\chi_2(z)$ for values of $\chi_2$ when $z$ is different from $\zeta_2$. Since it is known that $$\int_{z_0}^{z_1}\chi_2 dz\neq 0$$

satisfaction of (34) requires that $$(x(\zeta_2)^2-y(\zeta_2)^2)(x(\zeta_2)^2+\kappa y(\zeta_2)^2)=0$$

or i.e. that $$x(\zeta_2)^2=y(\zeta_2)^2 \quad (35)$$

Hence the axial position $\zeta_2$ for which $\chi_2$ is a maximum, and which is the position of the center plane of the correcting element, is that at which the electron trajectory is equidistant from the $x-z$ and $y-z$ meridian planes, i.e. the position of the circle of least confusion in the astigmatic bundle into which the bundle from the objective is transformed by the first four-pole element.

The corresponding power $C_2$, from (29) is $$C_2=\frac{a_1-a_2+4/3 M_o{}^4 C_{so}}{a_{12}-a_{22}} \quad (36)$$

in which $$a_{12}-a_{22}=\int_{z_0}^{z_1}\frac{(x(z)^4-x(z)^2 y(z)^2)}{[\rho_2{}^2+(z-z_2)^2]^{9/2}}dz \quad (37)$$

In (37) $\zeta_2$ in the right-hand member possesses the value required by (35). From (28) and (36) one can write:

$$C_1 a_{11}+C_3 a_{33}=\frac{a_1 a_{12}-a_1 a_{22}-M_o{}^4 C_{so}(\tfrac{1}{3}a_{12}a_{22})}{a_{12}-a_{22}} \quad (38)$$

The right-hand member of (38) is a number which can be calculated.

Equation 38 can be satisfied by setting $C_1$ equal to zero, i.e. by limiting oneself to one eight-pole corrector element in the field-free space outside the four-pole lens, in accordance with the examples of the invention illustrated in Figs. 9 and 12. In that case, the "first corrector" providing the function $C_1\chi_1$ of (22) is suppressed and the "third corrector" for the function $C_3\chi_3$ remains to be determined. Its axial position may be arbitrarily selected to the right of the second four-pole element, i.e. between the second four-pole element and $P_1$. With the selection of a position therefor, for the element 46 or 62 in Fig. 9 or Fig. 12, the value of $\zeta_3$ is determined and hence $\chi_3$ is determined by the relation:

$$\chi_3=\frac{1}{[\rho_3{}^2+(z-\zeta_3)^2]^{9/2}} \quad (39)$$

an appropriate choice being made for $\rho_3$. This determination of $\chi_3$ permits evaluation of $a_{33}$ from the expression therefor in (25). With evaluation of $a_{33}$, the value of $C_3$ is specified by (38), and the voltage or magnetic potential to be applied to the eight-pole element 46 or 62, according to the electrostatic or magnetic nature thereof, may be inferred from the relation:

$$C_3 = \left[ \frac{v_3}{U} \frac{1+2\epsilon U}{1+\epsilon U} + \mu_0 \sqrt{\frac{2e}{m_0}} \frac{N_3 I_3}{\sqrt{U(1+\epsilon U)}} \right] \rho_3^5 \quad (40)$$

analogous to (23). The four-element lens of Fig. 9 or Fig. 12 is thus completely determined.

Figure 20:
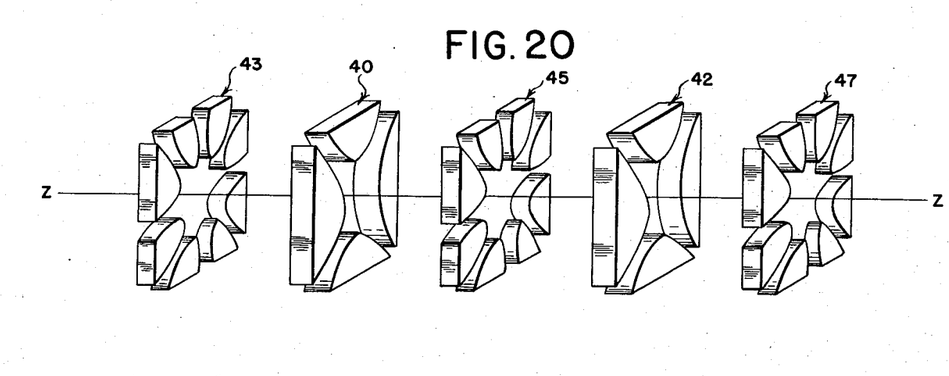
Figs. 20 and 21 are diagrammatic perspective views similar to those of Figs. 9 and 12 illustrating projection lenses according to the invention which include three eight-pole elements.
Figure 21:
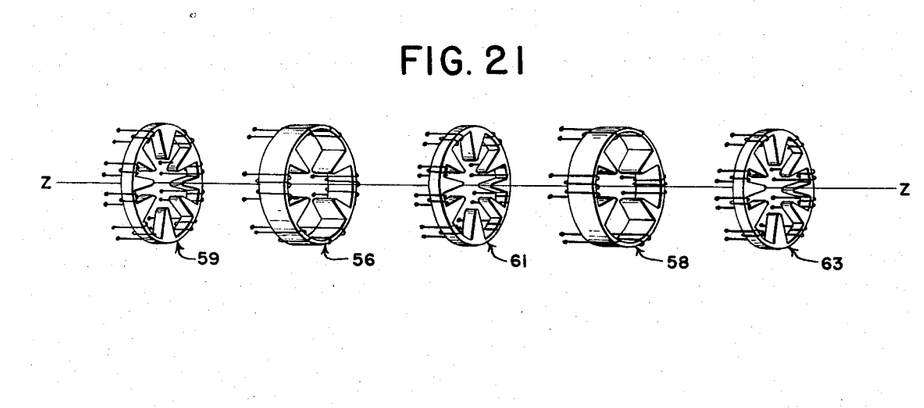

It is to be understood however that the invention is not limited to the embodiments of Figs. 9 and 12 in which $C_1=0$. Various practical considerations, for example those pertaining to voltages necessary to be applied, may make it desirable to use three eight-pole corrector elements. These may be used consistently with the positioning of the central or "second" one at the position of the circle of least confusion associated with the first four-pole element pursuant to the assumptions made in the foregoing analysis that $\chi_1 \neq 0$ only before, $\chi_2 \neq 0$ only inside, and $\chi_3 \neq 0$ only after the four-pole lens or otherwise. Such lenses including two four-pole and three eight-pole elements are diagrammatically illustrated for electrostatic and magnetic embodiments respectively in Figs. 20 and 21. The electrostatic lens of Fig. 20 comprises a pair of four-pole elements 40 and 42 constituting together a four-pole lens of the type illustrated in Fig. 1 and three eight-pole elements 43, 45 and 47. Elements 43, 45 and 47 may be of the type illustrated in Fig. 10. The eight-pole element 43 is axially positioned on the object side of the four-pole lens. The element 45 is positioned between the two elements of the four-pole lens, and the element 47 is positioned on the image side of the four-pole lens. The magnetic lens of Fig. 21 comprises a pair of four-pole elements 56 and 58 constituting together a four-pole lens of the type illustrated in Fig. 7 and three eight-pole elements 59, 61 and 63. Elements 59, 61 and 63 may be of the type illustrated in Fig. 13. The eight-pole element 59 is axially positioned on the object side of the four-pole lens. The element 61 is positioned between the two elements of the four-pole lens, and the element 63 is positioned on the image side of the four-pole lens. It is also for example possible to employ two eight-pole correcting elements within the four-pole field. If two rather than three correcting elements are to be employed, it is of course also possible to provide one between $P_0$ and the four-pole lens, by setting $C_3$ instead of $C_1$ equal to zero in (38).

In the most general sense, the invention contemplates the use of three eight-pole corrector elements in any combination of axial positions which permit satisfaction of Equations 26. From these equations generally, for any three arbitrary functions $\chi_1$, $\chi_2$, $\chi_3$ the constants $C_1$, $C_2$ and $C_3$ can be determined. With eight-pole elements the functions $\chi$, describing the axial dependence of the fields produced by those elements, will have the form of Equation 24 while the "strength" thereof will be determined by relations of the form of Equation 23.

The poles in the electrostatic elements of the figures thus far discussed have been shown as having the shape of short hyperbolic cylinders. This shape for the poles is a theoretically desirable one which may be applied to the poles of magnetic elements as well as to those of electrostatic elements. The improvement achieved by the hyperbolic cylindrical shape for the poles is however primarily in the extra-axial region where the field is under primary control of the eight-pole correcting elements. Lenses according to the invention therefore need not be constructed with a hyperbolic cylindrical shape for the poles.

Constructional forms for four-pole lenses according to the invention are shown in Figs. 14, 16, 18 and 19, while constructional forms for eight pole elements are shown in Figs. 15 and 17. In Fig. 14 two casing members 72 and 74 (shown broken away) each support one of two four-pole elements generally indicated at 76 and 78. The two four-pole elements are preferably identical. Each includes four poles 80 in the form of short circularly cylindrical metallic bars supported equiangularly about and equidistant from an axis by means of cylinders 82 of insulating material. In the case of the element 76 adjusting screws 84 threaded into the casing member 72 and diametrically opposite compression springs 86 positioned between the cylinder 82 and casing member 74 permit both translation and rotation of the element so that its axis of symmetry can be made to coincide with the symmetry axis of the element 78. At their adjacent ends the casing members 72 and 74 carry threads of opposite hand so that by rotation of a threaded sleeve 88 it is possible to adjust the axial spacing of the casing members and hence of the four-pole elements 76 and 78. Suitable external support members, not shown, may be provided for the casing members 72 and 74.

By means of one or more suitable voltage sources the poles 80 of each four-pole element are charged with respect to each other to a suitable electrostatic potential, the potential difference of this source being applied in successively opposite polarities between adjacent poles 80 around the system axis. The four poles 80 in each element are spaced successively 90° apart about the system axis, and the connections to the source or sources of potential are such that the meridian of the positively charged poles in the element 76 is the meridian of the negatively charged poles in the element 78. Mechanically therefore the four-pole elements 76 and 78 are identical in their orientation with respect to the system axis; electrically however the element 78 is rotated 90° about that axis from the position of the element 76.

An eight-pole element suitable for use with the four-pole lens of Fig. 14 is shown in Fig. 15. It comprises an insulating ring 89 supporting eight electrostatic poles 90 similar to the poles 80 of Fig. 14, though advantageously of shorter axial length. The poles 90 are equiangularly and equidistantly disposed from an axis. The structure may be dimensioned to fit inside the sleeves 72 and 74 of Fig. 14.

Fig. 16 represents a four-pole lens according to the invention similar to that of Fig. 1 but electromagnetic rather than electrostatic in nature. The casing members 92 and 94 and the threaded sleeve 108 together with the positioning screws and springs 104 and 106 may be similar to the corresponding elements of Fig. 14. The two magnetic four-pole elements are indicated generally at 96 and 98. Each includes an annular magnetic yoke 100 from which there project radially inward at 90° intervals four poles 101. Each of the poles 101 forms the core for a winding 110, shown broken away in Fig. 16, and the direction of current flow through these windings, as indicated by dots and crosses in the figure, is so established that in each of the two four-pole elements adjacent poles constitute magnetic poles of opposite sign whereas diametrically opposite poles constitute magnetic poles of the same sign. The currents and windings are so adjusted that all four magnetic poles of each element are of equal intensity. As with the electrostatic embodiment of Fig. 14 the meridian occupied in element 96 by the poles of one polarity is occupied in the element 98 by magnetic poles of the opposite polarity. The poles may be so shaped as to possess, in the portions thereof close to the axis, the shape of hyperbolic cylinders.

A magnetic eight-pole element is shown in elevation in Fig. 17. It includes a yoke 112 from which there project eight similar poles 114, equiangularly and equidistantly spaced from the axis. The energizing coils 116 are shown wound about the yoke between adjacent poles.

Other constructions may be employed to produce a plurality of magnetic poles of successively opposite polarity about an axis. One such alternate form of magnetic four-pole lens according to the invention is diagrammatically illustrated in Fig. 18. Here four horseshoe magnets 120 are supported, by means not shown, at uniform angular intervals about an axis to provide two arrays of four magnetic poles alternating in polarity about the system axis, with opposite polarities in the two arrays in any given meridian. In place of the permanent magnets 120, electromagnets may be used instead.

Figure 19:
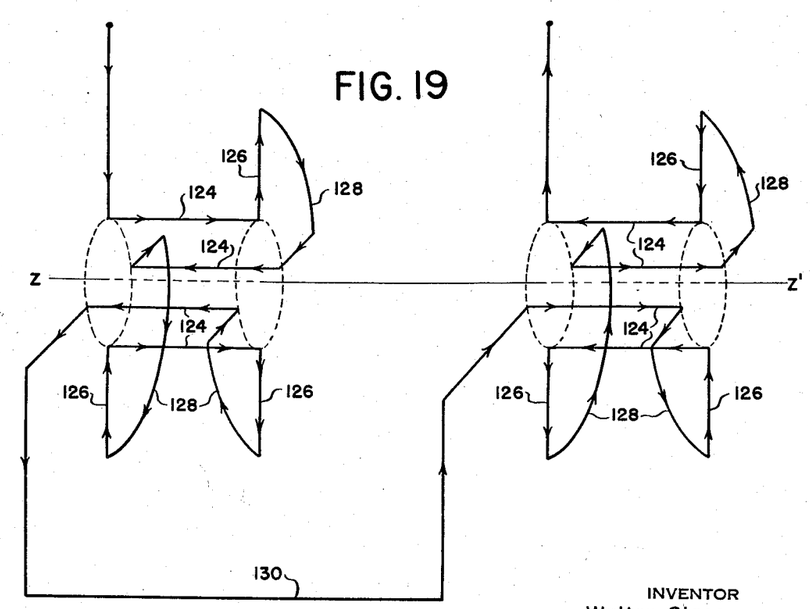

Fig. 19 indicates how the desired magnetic fields for a pair of four pole elements according to the invention may be produced simply by means of electric currents. Eight straight conductors 124 of the same length are disposed in two groups of four each, all supported by means not shown parallel to and equally spaced from a system axis $z$—$z'$, the conductors of each group being equiangularly disposed about and equidistant from the axis. In each group the four conductors are aligned in their position lengthwise of the axis. The conductors 124 of Fig. 19 are interconnected by means of radial portions 126 and remote circumferential portions 128, and by means of a lead 130 between the two groups of conductors. In the vicinity of the system axis and within the two regions defined by the two groups of conductors 124, the magnetic field is due substantially exclusively to the current flowing in the conductors 124. All eight are connected in series, and the connection is such as to provide opposite directions of current flow in circumferentially adjacent conductors of each goup. Moreover while the conductors in the two groups lie in a single pair of perpendicular meridians about the axis, the interconnection of the two groups is such that in each meridian the direction of current flow is opposite for similarly positioned wires in the two groups.

Figure 18:
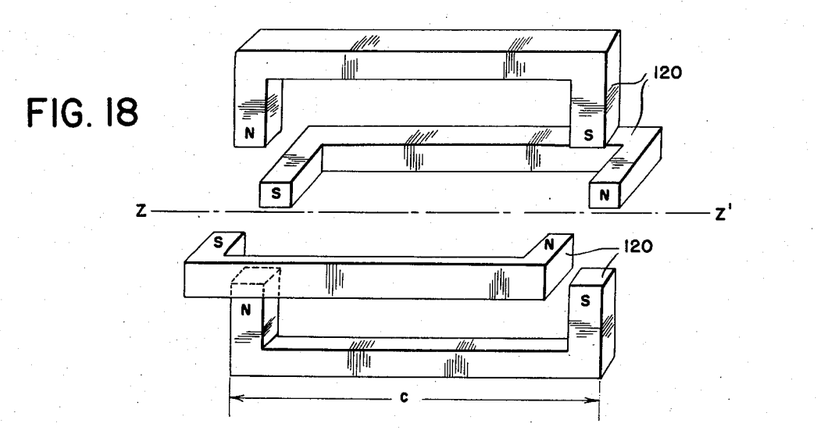
Figs. 18 and 19 are perspective diagrammatic views of other forms of four-pole electron lenses according to the invention.

Of course pairs of eight-pole elements can be built up from permanent or electromagnets in the fashion generally indicated in Fig. 18 by doubling the number of magnets employed, and eight-pole elements may be built up either singly or in pairs in the fashion generally indicated in Fig. 19 by doubling the number of conductors employed.

While the invention has been described in terms of a number of preferred embodiments, the invention itself is not limited to these. For example it is possible although not necessarily advantageous to use magnetic eight-pole elements with electrostatic four-pole elements and vice versa. The two four-pole elements or four-pole sets must however be the same. Thus they must be either electrostatic or electromagnetic and should moreover be substantially identical in electron optical respects, i.e. in their influence on a beam of electrons passing through them. Both four-pole sets should include four poles spaced equiangularly about and equidistant from the axis with the spacing of the poles from the axis the same for both four-pole sets. In the case of the eight-pole elements or eight-pole sets while all eight poles of any one element or set should be spaced equiangularly about and equidistant from the axis the spacing from the axis of the poles of the separate eight-pole elements may be unlike.

While the invention has been described in terms of the focusing of electrons, it is applicable to the focusing of an image formation with charged particles of other kinds, and the claims are to be so understood.

I claim:

1. An electron lens adapted to produce an image of a virtual object with negative third order spherical aberration comprising two identical sets of four poles coaxial in a common axis with the poles of said sets centered on two perpendicular meridian planes containing said axis, and a plurality of eight-pole elements coaxial in said axis.

2. An electron lens adapted for use as a projection lens in combination with an objective, said lens comprising two sets of four poles each, the poles of both of said sets being coaxial in and equiangularly spaced about a common axis at a common distance therefrom, the poles of both of said sets being centered on two perpendicular meridian planes containing said axis, said lens further comprising a plurality of sets of eight poles each, the poles of each of said eight-pole sets being coaxial in and equiangularly spaced about said axis at a common distance therefrom.

3. An electron lens adapted for use as a projection lens in combination with an objective, said lens comprising two sets of four poles each, the poles of both of said sets being coaxial in and equiangularly spaced about a common axis at a common distance therefrom, the poles of both of said sets being centered on two perpendicular meridian planes containing said axis, said lens further comprising two sets of eight poles each, the poles of each of said eight-pole sets being coaxial in and equiangularly spaced about said axis at a common distance therefrom, one of said eight-pole sets being axially disposed between said two four-pole sets adjacent the circle of least confusion in the astigmatic ray bundle produced by one of said four-pole sets and the other of said eight-pole sets being disposed on the side of one of said four-pole sets remote from the other of said four-pole sets.

4. A compound electron lens corrected for spherical aberration of the third order, said lens comprising a rotationally symmetric objective lens and a projection lens of four-fold symmetry positioned coaxially with the axis of said objective lens in position to magnify the virtual object provided by an image of a real object formed by said objective, said projection lens including two sets of four poles each, the poles of both of said sets being coaxial in and equiangularly spaced about said axis at a common distance therefrom, the poles of both of said sets being centered on two perpendicular meridian planes containing said axis, said projection lens further including a plurality of sets of eight poles each, the poles of each of said eight-pole sets being coaxial in and equiangularly spaced about said axis at a common distance therefrom.

5. A compound electron lens corrected for spherical aberration of the third order, said lens comprising a rotationally symmetric objective lens and a projection lens of four-fold symmetry positioned coaxially with the axis of said objective lens in position to magnify the virtual object provided by an image of a real object formed by said objective, said projection lens including two sets of four poles each, the poles of both of said sets being coaxial in and equiangularly spaced about said axis at a common distance therefrom, the poles of both of said sets being centered on two perpendicular meridian planes containing said axis, said projection lens further including two sets of eight poles each, the poles of each of said eight-pole sets being coaxial in and equiangularly spaced about said axis at a common distance therefrom, one of said eight-pole sets being axially disposed between said two four-pole sets adjacent the circle of least confusion in the astigmatic ray bundle produced by the one of said four-pole sets adjacent said objective lens and the other of said eight-pole sets being disposed on the side of the other of said four-pole sets remote from said objective lens.

6. An electron lens comprising two sets of four poles coaxial in a common axis with the poles of said sets centered on two perpendicular meridian planes containing said axis, the poles of each set being centered on a plane perpendicular to said axis, circumferentially adjacent poles of each set being of successively opposite sign and the poles of one set being of sign opposite to the poles of the other set at the same positions circumferentially of said axis.

7. A lens according to claim 6 adapted to focus electrons of energy U in which the poles of said two sets of four poles are equiangularly spaced about said common axis at a common distance therefrom, circumferentially adjacent poles of both sets being charged in successively opposite polarities to one of the potential differences $u$ volts and NI ampere turns, the poles centered on common half planes of said meridian planes being oppositely charged, said poles having an axial length $d$ and a spacing $c$ between the center planes of the two sets thereof specified by $$\frac{2d}{c} = \frac{\sqrt{k^2-1}}{k^2} \coth \pi\sqrt{k^2-1} - \frac{\sqrt{k^2+1}}{k^2} \cot \pi\frac{\sqrt{k^2+1}}{k^2}$$

in which $$k^2 = \frac{d^2}{\rho^2}\left[\frac{u}{2U}\frac{1+2\epsilon U}{1+\epsilon U} + \mu_0\sqrt{\frac{e}{2m_0}}\frac{NI}{\sqrt{U(1+\epsilon U)}}\right]$$

wherein $$\frac{e}{m_o}$$

is the specific charge of the electron, $\epsilon$ is one-half the specific charge of the electron divided by the square of the velocity of light, $\rho$ is the distance of said poles from said axis and $\mu_0$ is the inductivity of a vacuum.

8. An electrostatic lens according to claim 6 adapted to focus electrons of energy U in which the poles of said four-pole sets are electrostatic and are equiangularly spaced about said common axis at a distance $\rho_e$ therefrom, circumferentially adjacent poles of both sets being charged in successively opposite polarities to an electrostatic potential difference of $u$ volts, the poles centered on common half planes of said meridian planes being oppositely charged, said poles having an axial length $d$ and a spacing $c$ between the center planes of the two sets thereof specified by $$\frac{2d}{c} = \frac{\sqrt{k^2-1}}{k^2} \coth \pi\sqrt{k^2-1} - \frac{\sqrt{k^2+1}}{k^2} \cot \pi\frac{\sqrt{k^2+1}}{k^2}$$

wherein $$k^2 = d^2\left[\frac{1}{\rho_e^2}\frac{u}{2U}\frac{1+2\epsilon U}{1-\epsilon U}\right]$$

in which $\epsilon$ is one-half the specific charge of the electron divided by the square of the velocity of light.

9. An electromagnetic lens according to claim 6 adapted to focus electrons of energy U in which the poles of said four-pole sets are electromagnetic and are equiangularly spaced about said common axis at a distance $\rho_m$ therefrom, circumferentially adjacent poles of both sets being charged in successively opposite polarities to a magnetic potential difference NI ampere turns, the poles centered on common half planes of said meridian planes being oppositely charged, said poles having an axial length $d$ and a spacing $c$ between the center planes of the two sets thereof specified by $$\frac{2d}{c} = \frac{\sqrt{k^2-1}}{k^2} \coth \pi\sqrt{k^2-1} - \frac{\sqrt{k^2+1}}{k^2} \cot \pi\frac{\sqrt{k^2+1}}{k^2}$$

wherein $$k^2 = d^2 \mu_0 \sqrt{\frac{e}{2m_0}}\frac{1}{\rho_m^2}\frac{NI}{\sqrt{U(1+\epsilon U)}}$$

in which $\mu_0$ is the inductivity of the vacuum $$\frac{e}{m_0}$$

is the specific charge of the electron and $\epsilon$ is one-half the specific charge of the electron divided by the square of the velocity of light.

10. An electron lens according to claim 7 adapted for use in the system including an undercorrected rotationally symmetric objective lens of third order spherical aberration coefficient $C_{so}$ and magnification $M_0$ operating on electrons of energy U, said projection lens comprising two identical sets of four poles as claimed in claim 7 and two or more sets of eight poles coaxial in said axis, each of said sets of eight poles being positioned axially of the system along a $z$-coordinate at a chosen position $\zeta_k$ with the poles of each such set at a chosen distance $\rho_k$ from said axis, circumferentially adjacent poles in each of said eight-pole sets being charged in successively opposite polarities to one of the potential differences $v_k$ and $N_k I_k$ given by $$C_k = \left[\frac{v_k}{U}\frac{1+2\epsilon U}{1+\epsilon U} + \mu_0\sqrt{\frac{2e}{m_0}}\frac{N_k I_k}{\sqrt{U(1+\epsilon U)}}\right]\rho_k^5$$

wherein $$\frac{e}{m_0}$$

is the specific charge of the electrons, $\epsilon$ is one-half the specific charge of the electron divided by the square of the velocity of light, and $\mu_0$ is the inductivity of the vacuum, the quantities $C_k$ being solutions of the system of equations $$C_1\int_{z_0}^{z_1}\chi_1 x(z)^4 dz + C_2\int_{z_0}^{z_1}\chi_2 x(z)^4 dz + C_3\int_{z_0}^{z_1}\chi_3 x(z)^4 dz = a_1 + M_0^4 C_{so}$$

$$C_1\int_{z_0}^{z_1}\chi_1 x(z)^2 y(z)^2 dz + C_2\int_{z_0}^{z_1}\chi_2 x(z)^2 y(z)^2 dz + C_3\int_{z_0}^{z_1}\chi_3 x(z)^2 dz y(z)^2 dz = a_2 - \tfrac{1}{3}M_0^4 C_{so}$$

$$C_1\int_{z_0}^{z_1}\chi_1 y(z)^4 dz + C_2\int_{z_0}^{z_1}\chi_2 y(z)^4 dz + C_3\int_{z_0}^{z_1}\chi_3 y(z)^4 dz = a_3 + M_0^4 C_{so}$$

in which equations the limits of integration are the axial position $z_0$ of the object for the rotationally symmetric lens and the axial position $z_1$ of the image produced by the projection lens, $\chi_1$, $\chi_2$ and $\chi_3$ are functions of $z$ of the form $$\chi_k = \frac{1}{[\rho_k + (z-\zeta_k)^2]^{9/2}}$$

$x(z)$ and $y(z)$ are the projections onto said meridian planes of an electron trajectory with the initial conditions $$x(z_0) = y(z_0) = 0$$
$$x'(z_0) = y'(z_0) = 1$$

and $a_1$, $a_2$ and $a_3$ are the coefficients of third order spherical aberration of the lens of claim 7.

11. An electrostatic electron lens according to claim 6 including two substantially cylindrical casing members, means to support said members in coaxial relation and to vary the spacing thereof, an insulating cylinder within each of said casing members, the poles of each of said sets being supported in mutually insulated relation within a separate one of said cylinders, the poles in each of said cylinders being further centered on a plane perpendicular to said axis, and means to adjust one of said cylinders within its casing member to render said axes collinear.

12. An electromagnetic electron lens according to claim 6 in which said poles are magnetic, said lens comprising two substantially cylindrical casing members, means to support said members in coaxial relation and to adjust the spacing thereof, an annular magnetic yoke supported within each of said members, the magnetic poles of each of said sets projecting radially inwardly from a separate one of said yokes, a winding embracing each of said poles, and means to adjust one of said yokes within its casing member to render said axes collinear.

13. An electron lens according to claim 6 in which said two sets of four poles are formed by four magnets of horseshoe type, said magnets having substantially identical equally spaced poles, said magnets being disposed with the axes of their poles parallel to and arranged equiangularly about and equidistant from an axis, said last-named poles being centered on two planes perpendicular to said last-named axis, circumferentially adjacent poles in each of said planes being of opposite sign.

14. An electron lens according to claim 6 in which said two sets of four poles are formed by four electromagnets of horseshoe type, said magnets having substantially identical equally spaced poles, said magnets being disposed with the axes of their poles parallel to and arranged equiangularly about and equidistant from an axis, said last-named poles being centered on two planes perpendicular to said last-named axis, circumferentially adjacent poles in each of said planes being of opposite sign.

15. An electron lens according to claim 6 in which said two sets of four poles are formed by four permanent magnets of horseshoe type, said magnets having substantially identical equally spaced poles, said magnets being disposed with the axes of their poles parallel to and arranged equiangularly about and equidistant from an axis, said last named poles being centered on two planes perpendicular to said last-named axis, circumferentially adjacent poles in each of said planes being of opposite sign.

16. An electron lens according to claim 6 in which said two sets of four poles are formed by two groups of four conductors each, all of said conductors having substantially the same length, said conductors being disposed equiangularly about and equidistant from a common axis, said conductors lying substantially in two perpendicular planes containing said axis, the conductors of each of said groups being centered on a plane perpendicular to said axis, and means to energize all of said conductors with substantially the same current, the direction of current flow being opposite in circumferentially adjacent conductors of each of said groups and opposite in aligned ones of said conductors.

17. An electron lens according to claim 6 in which said two sets of four poles are formed by two groups of four conductors each, all of said conductors having substantially the same length, said conductors being disposed equiangularly about and equidistant from a common axis, said conductors lying substantially in two perpendicular planes containing said axis, the conductors of each of said groups being centered on a plane perpendicular to said axis, all of said conductors being connected in series for opposite directions of current flow in circumferentially adjacent conductors of each of said groups and for opposite directions of current flow in aligned ones of said conductors.

18. An eight-pole corrector element adapted to develop a field of four-fold symmetry comprising eight substantially identical poles disposed equiangularly about and equidistant from an axis, and means to charge said poles to successively opposite potentials.

References Cited in the file of this patent

UNITED STATES PATENTS

| | | |
|---|---|---|
| 2,157,182 | Muloff | May 9, 1939 |
| 2,200,039 | Nicoll | May 7, 1940 |
| 2,244,748 | Walker | June 10, 1941 |
| 2,455,676 | Hillier | Dec. 7, 1948 |
| 2,472,727 | Salinger | June 7, 1949 |
| 2,503,173 | Reisner | Apr. 4, 1950 |
| 2,513,221 | Webb | June 27, 1950 |
| 2,520,813 | Rudenberg | Aug. 29, 1950 |
| 2,722,621 | Schenau | Nov. 1, 1955 |
| 2,761,991 | Eisfeldt | Sept. 4, 1956 |
| 2,802,111 | Reisner | Aug. 6, 1957 |
| 2,802,138 | Tompkins | Aug. 6, 1957 |

UNITED STATES PATENT OFFICE
Certificate of Correction

Patent No. 2,919,381                                December 29, 1959

Walter Glaser

It is hereby certified that error appears in the printed specification of the above numbered patent requiring correction and that the said Letters Patent should read as corrected below.

Column 3, lines 20 and 21, Equation (10) should appear as shown below instead of as in the patent:

$$C_{sp} = -M_o{}^4 C_{so}$$

column 4, lines 44 and 45, the left-hand portion of Equation (13) should appear as shown below instead of as in the patent:

$$Z_{F_1} = \frac{c}{2} + \frac{d}{2}.$$

same column 4, line 48, in the denominator of the long fraction, the parentheses should be closed after "1", first occurrence; column 5, line 33, in the denominator of the fraction under the first radical sign on the left-hand side of the Equation (16), the italicized "o" should be a subscript to the italicized "m"; lines 36 and 37, the fraction should appear as shown below instead of as in the patent:

$$\frac{e}{m_o}$$

column 9, lines 6 to 8, for that portion of the equation following "$dz$," strike out $$a_{22} \int_{z_0}^{z_1}$$

same column 9, line 73, for that portion of the equation reading "$\chi =$" read $-\psi = -$; column 10, line 45, the parentheses in the denominator of the integrand on the right-hand side of Equation (37) should appear as shown below instead of as in the patent:

$$(z - \zeta_2)$$

same column 10, line 51, the quantity in parentheses in the numerator of the right-hand side of Equation (38) should appear as shown below instead of as in the patent:

$$(\tfrac{1}{3} a_{12} + a_{22})$$

column 15, line 72, for "the system" read —a system—; column 16, lines 14 to 16, the fraction should appear as shown below instead of as in the patent:

$$\frac{e}{m_o}$$

Signed and sealed this 5th day of July 1960.

[SEAL]

Attest:
KARL H. AXLINE,
*Attesting Officer.*

ROBERT C. WATSON,
*Commissioner of Patents.*